United States Patent [19]
Sivik et al.

[11] Patent Number: 5,672,266
[45] Date of Patent: Sep. 30, 1997

[54] TREATMENT OF ORGANIC COMPOUNDS TO REDUCE CHLORINE LEVEL

[75] Inventors: Matthew R. Sivik, Parma; Mohamed G. Fahmy, Eastlake, both of Ohio

[73] Assignee: The Lubrizol Corporation, Wickliffe, Ohio

[21] Appl. No.: 543,242

[22] Filed: Oct. 13, 1995

[51] Int. Cl.$^6$ .................. C10M 131/00; C10M 147/00; C07C 17/38
[52] U.S. Cl. .................. 208/262.1; 252/58; 252/54; 252/56 D; 570/262
[58] Field of Search .................. 549/252; 525/285, 525/357, 359.4, 371; 208/262.1; 252/58, 54, 56 D; 570/262

[56] References Cited

U.S. PATENT DOCUMENTS

| | | | |
|---|---|---|---|
| 3,215,707 | 11/1965 | Rense | 260/326.3 |
| 3,231,587 | 1/1966 | Rense | 260/346.8 |
| 3,499,839 | 3/1970 | Boehm | 252/33.4 |
| 3,944,539 | 3/1976 | Horodysky . | |
| 3,975,271 | 8/1976 | Saunier | 210/62 |
| 4,049,382 | 9/1977 | Ross | 23/230 R |
| 4,148,737 | 4/1979 | Liston | 252/32.7 E |
| 4,148,739 | 4/1979 | Liston | 252/32.7 E |
| 4,224,139 | 9/1980 | Schiff | 208/18 |
| 4,234,435 | 11/1980 | Meinhardt | 252/51.5 A |
| 4,615,806 | 10/1986 | Hilton | 210/690 |
| 4,943,671 | 7/1990 | Dockner | 585/642 |
| 5,057,207 | 10/1991 | Basler | 208/262.1 |
| 5,141,629 | 8/1992 | Pri-Bar | 208/262.1 |
| 5,185,488 | 2/1993 | Hawari | 585/469 |
| 5,314,614 | 5/1994 | Moser | 208/262.1 |
| 5,382,736 | 1/1995 | Baghel | 585/469 |
| 5,410,088 | 4/1995 | Harris | 568/21 |
| 5,489,390 | 2/1996 | Sivik et al. | 252/58 |

FOREIGN PATENT DOCUMENTS

| | | |
|---|---|---|
| 793825 | 9/1968 | Canada . |
| 2273014 | 12/1975 | France . |
| 9321117 | 10/1993 | WIPO . |

OTHER PUBLICATIONS

The Merck Index an Encyclopedia of Chemicals and Drugs, 8th Edition, 1968, p. 1164.

*Primary Examiner*—C. Warren Ivy
*Assistant Examiner*—Lyman H. Smith
*Attorney, Agent, or Firm*—William J. Connors; Frederick D. Hunter

[57] ABSTRACT

The present invention relates to a process for reducing the chlorine content of an organochlorine compound comprising: introducing into the organochlorine compound, at least one Lewis acid to form a mixture, and contacting the organochlorine compound with the Lewis acid in the mixture in the absence of elemental carbon for a sufficient amount of time to reduce the chlorine content of the organochlorine compound. In another embodiment, a process is described for reducing the chlorine content of an organochlorine compound comprising contacting the organochlorine compound with (a) at least one acid selected from the group consisting of Lewis acids, mineral acids other than hydriodic acid and hydrobromic acid, and organic acids having a pKa of less than about 2, and (b) a source of iodine or bromine in the absence of elemental carbon for a sufficient amount of time to reduce the chlorine content of the organochlorine compound. In all embodiments of the invention, the organohalogen compound is contacted with the indicated acids and optionally the source of iodine or bromine in the absence of elemental carbon. In other embodiments, the organochlorine compounds may comprise a chlorine-containing polyalkenyl succinic anhydride, and a chlorine-containing reaction product of a polyisobutylene and maleic anhydride prepared in the presence of chlorine. Polyalkenylsuccinic anhydrides treated in accordance with the method of the present invention to reduce the chlorine content thereof may be further reacted with a polyamine or a polyol, or a mixture of a polyamine and a polyol to form the compounds which are useful as dispersants in lubricating oil compositions. Such dispersants and lubricating oil compositions also are described herein.

18 Claims, No Drawings

TREATMENT OF ORGANIC COMPOUNDS TO REDUCE CHLORINE LEVEL

FIELD OF THE INVENTION

This invention relates to the treatment of various chlorine-containing organic compounds in the absence of elemental carbon to reduce the level of chlorine in the organic compound. The invention has particular utility in preparing compounds for the lubricant industry.

BACKGROUND OF THE INVENTION

For many years chlorine has been used to facilitate the processing of various organic compounds to obtain a variety of useful products. Organic compounds whether intentionally incorporating chlorine or by carrying a chlorine containing by-product may generate hydrochloric acid upon burning.

Among various halogenated products which are now restricted for production or which are being eliminated include materials such as chlorinated biphenyl, dioxin, and various ozone depleting materials such as chlorofluorocarbons propellants. More innocuous sources of organochlorine include products utilized as dispersants in motor oils. A dispersant is a compound which aids in keeping sludge from accumulating on engine parts. Due to environmental concerns, particularly in Europe, it has become desirable to eliminate or reduce the level of chlorine in products no matter how small the amount of the chlorine initially.

One potential solution to eliminating chlorine containing compounds is simply not to prepare any compounds in which the chlorine is an ingredient or which form a chlorinated by-product. The impracticalities of eliminating the production of all chlorine containing compounds worldwide should be readily apparent given the large amount of chemical production dependent upon the use of chlorine. Products which contain only small amounts of organochlorine and in which the chlorine does not impart a desired property to the composition may be treated to remove the chlorine. Such a process would have to be one which did not cause damage to the desired end product. Chlorine is in any event a desirable reactant in the chemical industry and is often utilized to promote or cause a faster reaction to give the desired end product.

Thus the present invention deals with methods of treating the organic chlorine containing compounds to reduce the chlorine content to acceptably low levels. The process may be modified such that the desired composition only contains a minor amount of organic chlorine and that the overall product's essential characteristics are not changed. In those products where the chlorine content is relatively high, the process is conducted to convert the underlying organic substrate to a relatively low chlorine content by-product.

The Finkelstein substitution was first described in Ber. 43,1528 (1910). Organic iodide compounds were obtained from the chlorides or bromides by treatment with sodium or potassium iodide in acetone solution. It was noted by Finkelstein that primary alkyl halides were the most reactive compounds and the tertiary were the least reactive. It was further observed that the treatment of 1,2-dihalides yields ethylenic derivatives. For further information on the Finkelstein substitution see *The Merck Index An Encyclopedia of Chemicals and Drugs.* 8th Edition, 1968.

U.S. Pat. No. 3,975,271 issued Aug. 17, 1976 to Saunier et al teaches water disinfection or sterilization is stated to be typically conducted with sodium hypochlorite. A difficulty noted by Saunier et al is that chlorine treatment alone often is ineffective due to the chlorine being tied up in the form of chloramines. Saunier, et al suggest that bromine and/or iodine may be helpful in treating water supplies.

Ross et al, in U.S. Pat. No. 4,049,382, issued Sep. 20, 1977 discuss a method for monitoring total residual chlorine in solution. The process of Ross is described as mixing a sample stream with a reagent stream containing a disassociated complex of alkali metal ion and iodide ion as well as an excess amount of iodide ion. The process is stated to take place such that iodide ion reacts with all residual chlorine in the sample stream and is converted to iodine. The activity of the iodine is then measured in the resultant stream by potentiometric titration.

The manufacture of various lubricating oil components is discussed in U.S. Pat. No. 3,231,587 issued Jan. 25, 1966 to Rense. Similar disclosures are found in U.S. Pat. No. 3,215,707 to Rense which issued on Nov. 2, 1965. The Rense patents generally discuss a process utilizing chlorine to obtain the reaction between a long chain hydrocarbon and maleic anhydride or maleic acid.

More recently, disclosures concerning the production of organo substituted maleic anhydride are found in U.S. Pat. No. 4,234,435 issued Nov. 18, 1980 to Meinhardt et al.

U.S. Pat. No. 4,943,671 to Dockner et al describes a process for reductive dehalogenation of organic halogen compounds. The organic halogen compounds are reacted with a hydrocarbon in the presence of carbon and iron powder or an iron compound at elevated temperatures with the formation of hydrogen halide.

SUMMARY OF THE INVENTION

A process for reducing the chlorine content of an organochlorine compound is described, and the process comprises: introducing into the organochlorine compound, at least one Lewis acid to form a mixture, and contacting the organochlorine compound with the Lewis acid in the mixture in the absence of elemental carbon for a sufficient amount of time to reduce the chlorine content of the organochlorine compound.

In another embodiment, a process for reducing the chlorine content of an organochlorine compound is described which comprises contacting the organochlorine compound with (a) at least one acid selected from the group consisting of Lewis acids, mineral acids other than hydriodic acid and hydrobromic acid, and organic acids having a pKa of less than about 2, and (b) a source of iodine or bromine in the absence of elemental carbon for a sufficient amount of time to reduce the chlorine content of the organochlorine compound. In all embodiments of the present invention, the organohalogen compound is contacted with the indicated acid or acids and optionally the source of iodine or bromine in the absence of any elemental carbon.

In other embodiments, the organochlorine compounds may comprise a chlorine-containing polyalkenyl succinic anhydride, and a chlorine-containing reaction product of a polyisobutylene and maleic anhydride prepared in the presence of chlorine. Polyalkenylsuccinic anhydrides treated in accordance with the method of the present invention to reduce the chlorine content thereof may be further reacted with a polyamine or a polyol, or a mixture of a polyamine and a polyol to form the compounds which are useful as dispersants in lubricating oil compositions. Such dispersants and lubricating oil compositions also are described herein.

DESCRIPTION OF THE PREFERRED EMBODIMENTS

The term "hydrocarbyl" includes hydrocarbon, as well as substantially hydrocarbon, groups. Substantially hydrocarbon describes groups which contain non-hydrocarbon substituents which do not alter the predominately hydrocarbon nature of the group.

Examples of hydrocarbyl groups include the following:

(1) hydrocarbon substituents, that is, aliphatic (e.g., alkyl, alkenyl or alkynyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, keto, mercapto, alkylmercapto, nitro, nitroso, sulfoxy, etc.);

(3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every 10 carbon atoms in the hydrocarbyl group often, there will be no such non-hydrocarbon substituents in the hydrocarbyl group, and the hydrocarbyl group is purely a hydrocarbon group.

The term "in the absence of elemental carbon" as used in the specification and in the appended claims means that the mixture does not contain a significant amount of elemental carbon. The mixtures may contain some elemental carbon which is present as an impurity in one or more of the components of the mixture. Accordingly, mixtures prepared in accordance with this invention may contain up to about 0.1% or even up to about 0.5% by weight of elemental carbon.

Measurements herein are understood to be approximate. Thus the word "about" may be introduced prior to any such measurement in the specification and claims. Ranges and ratios may be combined to further describe the invention. Temperatures given herein are in degrees Celsius, parts and percentages are by weight, and pressures are in kPa gauge unless otherwise indicated. Where a ratio of bromine or iodine is expressed to chlorine herein, the ratio is in equivalents, e.g. I to Cl.

It is understood that at least some of the chlorine is chemically incorporated in an organic compound (hereafter organochlorine compound or chlorine-containing organic compound), and other chlorine may be present as a solubilized or otherwise suspended salt. The bromine or iodine used herein is in any form capable of generating elemental iodine, hydrogen iodide, bromine or hydrogen bromide.

The invention is particularly useful for lowering the chlorine content of chlorinated polymers. Without wishing to be bound by any theory, the invention is useful in treating chlorinated compounds such as polyisobutylene where the potential exists for the chlorine to be located on hindered secondary carbons or on neo primary carbons (a primary carbon bonded to a quaternary carbon). It is understood that when referring to polyisobutylene that the "pure" hydrocarbon and chlorinated polyisobutylene are used interchangeably and when only the chlorinated form is meant that the term polyisobutenylchloride is used. Similarly, when referring to polyisobutenylsuccinic anhydride, the "pure" anhydride and chlorinated polyisobutenylsuccinic anhydride are included, and when only the chlorinated form is intended, the term chlorinated polyisobutenylsuccinic anhydride is used.

The present invention, as previously noted, relates to a process for treating organochlorine compounds (or chlorine-containing compounds) to reduce the chlorine content. A wide variety of organochlorine compounds may be treated in accordance with the process of the present invention. Simple experimentation under appropriate usage conditions is described herein will allow the technician to routinely practice the invention and to determine if the process is applicable to particular chlorine-containing compounds.

The organochlorine compounds which may be treated according to the present invention in order to reduce the chlorine content thereof may be chlorine-containing organic polymeric compounds and mixtures comprising chlorine containing organic polymeric compositions. In one embodiment the organochlorine compounds treated in accordance with the invention may be mixtures comprising a polyalkene-substituted succinic anhydride and chlorine which may be free (e.g., $Cl_2$ or HCl) and/or bonded chlorine such as polyalkenyl chloride, chlorinated polyalkenylsuccinic anhydride, chlorinated succinic anhydride, etc. In one preferred embodiment the organochlorine compounds are polyalkylene succinic anhydrides and in particular polyisobutenylsuccinic anhydride mixtures containing up to about 20% by weight of polyisobutene and small amounts of free and/or bonded chlorine. The polyalkylene succinic anhydrides are often referred to as substituted carboxylic or succinic acylating agents.

The substituted succinic acylating agents can be characterized by the presence within their structures of two groups or moieties. The first group is referred to hereinafter, for convenience, as the "substituent group" and is derived from a polyalkene. The polyalkenes from which the substituent groups are derived may be characterized by an $\overline{M}n$ (number average molecular weight) value of at least about 300. More often the $\overline{M}n$ value is at least about 900, preferably at least about 1300 up to about 5000 or even 10,000. In other embodiments, the polyalkenes also can be characterized as having $\overline{M}w/\overline{M}n$ values of from about 1.3 to about 4 or higher.

The second group or moiety of the acylating agent is referred to herein as the "succinic group(s)." The succinic group(s) should contain groups which can react with alcohols to form esters, ammonia or amines to form imides, amides or amine salts, or reactive metals or basically reactive metal compounds to form metal salts.

A preferred chlorine-containing compound which may be treated according to the present invention in order to reduce the chlorine content thereof is a polyalkylenesuccinic anhydride and in particular a polyisobutenylsuccinic anhydride. The preferred compounds have a $\overline{M}n$ value of about 1,300 to about 5,000 and an $\overline{M}w/\overline{M}n$ value of about 1.5 to about 4. The acylating agent is further characterized by having within its structure, at least 1.3 groups derived from the dibasic, carboxylic reactant for each equivalent weight of the groups derived from the polyalkylene (polyisobutylene). For the purpose of convenience, the disclosure of preferred organochlorine compounds which may be treated according to the present invention are found in U.S. Pat. No. 4,234,435 issued Nov. 18, 1980 to Meinhardt and Davis. The entire text of U.S. Pat. No. 4,234,435 is incorporated by reference.

The carboxylic acylating agents containing chlorine which can be treated in accordance with the process of the present invention include such agents prepared by known processes wherein a polyalkene is reacted with an unsaturated dicarboxylic acid or anhydride such as maleic acid or maleic anhydride. One method of preparing a succinic acylating agent is conveniently designated as the "two-step procedure" and is described in, for example, U.S. Pat. No. 3,219,666. It involves first chlorinating the polyalkene until there is an average of at least about one chloro group for each molecular weight of polyalkene. (For purposes of this invention, the molecular weight of the alkene is the weight corresponding to the $\overline{M}n$ value.) Chlorination involves merely contacting the polyalkene with chlorine gas until the desired amount of chlorine is incorporated into the chlorinated polyalkene. Chlorination is generally carried out at temperatures of about 75° C. to about 125° C. If a diluent is used in the chlorination procedure, it should be one which is not itself readily subject to further chlorination. Poly- and perchlorinated and/or fluorinated alkyl benzenes are examples of suitable diluents.

The second step in the two-step chlorination procedure is to react the chlorinated polyalkene with the maleic reactant at a temperature usually within the range of about 100° C. to about 200° C. The mole ratio of chlorinated polyalkene to maleic reactant is usually about 1:1. (For purposes of making the two-step chlorinated product, a mole of chlorinated polyalkene is that weight of chlorinated polyalkene corresponding to the $\overline{M}n$ value of the unchlorinated polyalkene.) However, a stoichiometric excess of maleic reactant can be used, for example, a mole ratio of 1:2.

If an average of more than about one chloro group per molecule of polyalkene is introduced during the chlorination step, then more than one mole of maleic reactant can react per molecule of chlorinated polyalkene. Because of such situations, it is better to describe the ratio of chlorinated polyalkene to maleic reactant in terms of equivalents. (An equivalent weight of chlorinated polyalkene, for the preparation of a two-step chlorinated product, is the weight corresponding to the $\overline{M}n$ value divided by the average number of chloro groups per molecule of chlorinated polyalkene while the equivalent weight of the maleic reactant is its molecular weight.) Thus, the ratio of chlorinated polyalkene to maleic reactant will normally be such as to provide about one equivalent of maleic reactant for each mole of chlorinated polyalkene up to about one equivalent of maleic reactant for each equivalent of chlorinated polyalkene with the understanding that it is normally desirable to provide an excess of maleic reactant; for example, an excess of about 5% to about 25% by weight. Unreacted excess maleic reactant may be stripped from the reaction product, usually under vacuum, or reacted during a further stage of the process as explained below.

The resulting polyalkenyl-substituted succinic acylating agent is, optionally, again chlorinated if the desired number of succinic groups are not present in the product. If there is present, at the time of this subsequent chlorination, any excess maleic reactant from the second step, the excess will react as additional chlorine is introduced during the subsequent chlorination. Otherwise, additional maleic reactant is introduced during and/or subsequent to the additional chlorination step. This technique can be repeated until the total number of succinic groups per equivalent weight of substituent groups reaches the desired level.

Another procedure for preparing substituted succinic acid acylating agents utilizes a process described in U.S. Pat. No. 3,912,764 and U.K. Patent No. 1,440,219, both of which are expressly incorporated herein by reference for their teachings in regard to that process. According to that process, the polyalkene and the maleic reactant are first reacted by heating them together in a "direct alkylation" procedure. When the direct alkylation step is completed, chlorine is introduced into the reaction mixture to promote reaction of the remaining unreacted maleic reactants. According to the patents, 0.3 to 2 or more moles of maleic anhydride are used in the reaction for each mole of olefin polymer; i.e. polyalkene. The direct alkylation step is conducted at temperatures of 180° C. to 250° C. During the chlorine-introducing stage, a temperature of 160° C. to 225° C. is employed. In utilizing this process to prepare the substituted succinic acylating agents useful herein, it would be necessary to use sufficient maleic reactant and chlorine to incorporate at least 1.3 succinic groups into the final product for each equivalent weight of groups derived from the polyalkene.

A further method of preparing a succinic acylating agent is disclosed in U.S. Pat. No. 3,231,587 issued Jan. 25, 1966 to Rense which is herein incorporated specifically by reference. This process, known as the "one step" process, and comprises preparing a mixture of an olefin polymer and maleic anhydride, and contacting said mixture at a temperature above about 140° C. with at least about one mole of chlorine for each mole of maleic anhydride. The product of the above process, as indicated before, is a hydrocarbon-substituted succinic anhydride, but it is not yet established whether the hydrocarbon radical is a saturated radical or one having olefinic linkages. The mechanism by which the product is formed is likewise not known. It is known, however, that the process is different from one in which the olefin polymer is first chlorinated and the chlorinated polymer is then allowed to react with maleic anhydride under similar reaction conditions. The two-step process requires a considerably lengthier reaction time and results in products which are much darker in color. Also, if the olefin polymer is to be chlorinated first, the chlorination temperature should not be allowed to exceed 120° C. Higher temperatures are known to cause dechlorination and thus result in products having little or no chlorine.

To carry out the process, it is preferred that the chlorine be introduced into the reaction zone after the olefin polymer has been thoroughly mixed with maleic anhydride. If the chlorine is allowed to come into contact with the olefin polymer prior to the introduction of maleic anhydride, chlorination of the polymer will take place and the advantageous results will not be obtained. The rate of introduction of the chlorine is not critical. Ordinarily, for maximum utilization of the chlorine used, the rate should be about the same as the rate of consumption of chlorine in this reaction.

The minimum temperature at which the reaction of the above process takes place at a reasonable rate is about 110° C.; hence, the minimum temperature at which the process should be carried out is in the neighborhood of 140° C. The preferred temperatures usually range between about 160° C. and about 220° C. Higher temperatures such as 250° C. or even higher may be used but usually with little advantage. The upper limit of the usable temperature is determined primarily by the decomposition point of the components in the reaction mixture.

The stoichiometry of the reaction involved in the herein-described process requires approximately equimolar amounts of the maleic anhydride and the chlorine used. For practical considerations, however, a slight excess, usually in the neighborhood of 20–30%, of chlorine is preferred in order to offset any accidental loss of this gaseous reactant from the reaction mixture. Still greater amounts of chlorine may be used but they do not appear to produce any noticeable benefits.

The relative amounts of the olefin polymer and maleic anhydride will vary according to the proportion of the succinic anhydride radicals desired in the product. Thus, for each mole of the polymer employed, one or more moles of maleic anhydride may be used depending upon whether one or more succinic anhydride radicals are to be incorporated in each polymer molecule. In general, the higher the molecular weight of the polymer, the greater the proportion of maleic anhydride which may be used. On the other hand, when a molar excess of the polymer reactant is used, the excess polymer will simply remain in the product as a diluent without any adverse effect.

As indicated previously the process of this invention is applicable to the treatment of hydrocarbon substituted succinic anhydride derived from olefin polymers. The olefin polymers include principally the homopolymers and copolymers of lower mono-olefin, i.e., ethylene, propene, isobutene, and n-butene. Copolymers of the above-illustrated lower mono-eolefins with copolymerizable higher mono-olefins or diolefins such as hexene, cyclohexene, butadiene, isoprene, chloroprene, etc. are likewise contemplated for use herein, provided that the lower mono-olefin units comprise at least 90–95% by weight of the polymer. The copolymers may be exemplified by copolymers of 99% of isobutene with 1% of butadiene, copolymers of 95% of isobutene with 5% of styrene, copolymers of 98% of propene with 2% of piperylene, terpolymers of 98% of isobutene with 1% of piperylene and 1% of propene, etc. For the most part, polymers of isobutene are preferred for reasons of their ready availability and the particular utility of the products obtained therefrom. The molecular weights of the polymers contemplated for use herein may vary within broad limits such as from about 100 to about 50,000 or even higher.

In one embodiment, the chlorine content of the chlorine-containing compounds is reduced in accordance with the process of the present invention by contacting the chlorine-containing compound with at least one Lewis acid in the absence of elemental carbon for a period of time sufficient to reduce the chlorine content of the organochlorine compound.

A wide variety of Lewis acids are useful in the process of the present invention. Various compounds of zinc, magnesium, calcium, iron, copper, boron, aluminum, tin and titanium are useful Lewis acids. Examples of zinc compounds useful as well as Lewis acids in the process of the present invention includes zinc acetate, zinc oleate, zinc bromide, zinc chloride, zinc iodide, zinc oxide and zinc sulfate. Examples of iron compounds include ferrous acetate, ferric acetate, ferrous bromide, ferric bromide, ferrous chloride, ferric chloride, ferrous iodide and ferric iodide. Examples of magnesium compounds include magnesium iodide and magnesium sulfate. Calcium compounds such as calcium iodide and calcium sulfate are useful. Examples of copper compounds include cuprous oxide, cuprous chloride, cupric acetate, cupric bromide, cupric chloride, cupric iodide, cupric oxide, cupric sulfate and cupric sulfide. Examples of boron compounds include boron trifluoride, boron trichloride, boron tribromide, trimethylborane, triethylborane, trimethylborate, triethylborate, triisopropylborate and tributylborate. Examples of aluminum compounds include trialkylaluminum compounds such trimethylaluminum, triethylaluminum and triisobutylaluminum; aluminum alkoxides such as aluminum isopropoxides, aluminum sec-butoxides and aluminum t-butoxides; aluminum halides such as aluminum fluorides, aluminum chlorides and aluminum bromides; and aluminum oxide. Examples of tin compounds include the stannous and stannic forms of tin acetate, tin bromide, tin chloride, tin iodide and tin sulfate. Examples of titanium compounds include titanium (IV) chloride, titanium (IV) isopropoxide, titanium (IV) isobutoxide and titanium (IV) ethoxide and titanium oxides. Any of the above Lewis acids may be converted to other Lewis acids under the process conditions. For example, zinc oxide may be converted to zinc chloride by reaction with chlorine or hydrogen chloride present in the organochlorine compound, or the zinc oxide may be converted to zinc iodide by reaction with the source of iodine added to the reaction mixture. Lewis acids may also be formed in situ by adding to the reaction mixtures, metals such as magnesium, aluminum, zinc, etc. Other examples of Lewis acids which may be utilized include ethyl ethylene-tetracarboxylate and tetracyanoethylene.

The amount of the Lewis acid which is introduced into the organochlorine compound may vary over a wide range, and generally, the amount of acid (on an equivalent basis) is conveniently in the range of from about $1 \times 10^{-5}$ to about 5 equivalents of acid per equivalent of chemically bound (covalent) chlorine in the organo chlorine compound. More often the ratio will be from about $1 \times 10^{-3}$ to about 2 equivalents of acid per equivalent of chemically bound chlorine in the organochlorine compound. In another embodiment, the amount of acid may range from about 0.0001% to about 5% by weight based on the weight of organochlorine compound. More often, the acid is present in amounts of from about 0.001% to about 2.5% by weight based on the weight of organochlorine compound.

In another embodiment of the present invention, the organo-chlorine compounds are contacted with (a) at least one acid selected from the group consisting of Lewis acids, mineral acids other than hydriodic acid and hydrobromic acid, and organic acids having a pKa of less than about 2, and (b) a source of iodine or bromine in the absence of elemental carbon for a sufficient amount of time to reduce the chlorine content of the organo-chlorine compound. In one preferred embodiment, the organochlorine compound is contacted with at least one Lewis acid and a source of iodine or bromine in the absence of elemental carbon to reduce the chlorine content of the organochlorine compound.

Mineral acids, other than hydriodic acid and hydrobromic acid which may be utilized in the present invention include strong mineral acids such as sulfuric acid, nitric acid, phosphoric acid, pyrophosphorus acid, hypoiodus acid, etc. The acid also may be a strong organic acid such as organic acids having a pKa of less than about 2. Examples of such acids include aliphatic and aromatic sulfonic acids such as methane sulfonic acid, trifluoromethyl sulfonic acid, benzene sulfonic acid, various p-alkylbenzene sulfonic acids, p-toluene sulfonic acid, and naphthalene sulfonic acid; carboxylic acids such as cyclopropane-1,1-dicarboxylic acid, nitroacetic acid, dichloroacetic acid, maleic acid, oxalic acid, picric acid, trichloroacetic acid, trifluoroacetic acid, trihydroxybenzoic acid; phenolic compounds such as trinitrophenol; and phosphonic acids such as phenyl phosphonic acid, methyl phosphonic acid and trifluoromethyl phosphonic acid.

Mixtures of any of the above-described acids can be utilized in the process of the present invention. For example, mixtures of Lewis acids, a mixture of a Lewis acid and a mineral acid, and a mixture of a Lewis acid and an organic acid may be utilized in the process of the present invention. In one embodiment, a mixture of a zinc salt and an iron salt has been found to be useful. When a mixture of acids is utilized in the process of the present invention, the acids can be added as a mixture, or the acids can be added to the organochlorine compound sequentially and in any order.

The amount of the at least one acid which is introduced into the organochlorine compound may vary over a wide range, and generally, the amount of acid (on an equivalent basis) is conveniently in the range of from about $1 \times 10^{-5}$ to about 5 equivalents of acid per equivalent of chemically bound (covalent) chlorine in the organo chlorine compound. More often the ratio will be from about $1 \times 10^{-3}$ to about 2 equivalents of acid per equivalent of chemically bound chlorine in the organochlorine compound. In another embodiment, the amount of acid may range from about 0.0001% to about 5% by weight based on the weight of organochlorine compound. More often, the acid is present in amounts of from about 0.001% to about 2.5% by weight based on the weight of organochlorine compound.

The source of iodine or bromine utilized in the process of the invention may be the elemental forms of those materials, preferably iodine. Other additional sources of iodine or bromine include the respective hydrogen iodide or hydrogen bromide; materials such as $I_3^-$, $I^-$, $I_2Cl^-$, $ICl$, $I^+$, or $IO^-$; or an organic iodide (preferably alkyl) such as t-butyl iodide; or an iodide salt. Sources of bromine include bromine, and materials analogous to the iodide sources. It is preferred in most situations to avoid the use of a salt as such must then be removed or left in the product typically as non-functional residue. Where a salt is employed it is preferred that it be the sodium, lithium, potassium, calcium or magnesium salt.

Uniquely, the use of the source of iodine or bromine liberates the chlorine but does not appreciably incorporate bromine or iodine into the organochlorine compound. It is noted herein that the term organochlorine compound refers to the starting compound and in the appropriate context to the compound so treated according to the present invention.

The chlorine content of the starting material may be at any level with the desired reduction by the present invention to an appreciably lower level in the treated organochlorine compound. The chlorine content of the treated organochlorine compound is conveniently reduced to less than 10%, preferably less than 5%, more preferably from 0.001% to 1.0%, and especially preferably less than 0.5% by weight. For example, where the chlorine content of an initial mixture of polyisobutylene and polyisobutylene succinic anhydride is from 0.05 to 2% by weight, the chlorine content of the resultant mixture (treated according to the invention) may be from 0.001 to 0.3 percent by weight. Typically, the amount of the iodine or bromine incorporated into the organochlorine compound will be less than 40%, more preferably less than 1% to 20% by weight of the chlorine removed from the organochlorine product.

It is noted that varying the source of the iodine or the bromine is not particularly important in the present invention since the iodine or bromine source may be converted to another form during the dechlorination process. Thus the source of iodine or bromine is a material which will generate one or more of iodine, bromine, hydrogen iodide, or hydrogen bromide.

The amount of the source of iodine or bromine employed in combination with the acid compounds described above is generally determined by one or more conditions. Typically, the higher the level of the source of iodine or bromine employed the faster and more efficiently the process will proceed to reduce the chlorine content of the organochlorine compound. The process appears to be one which functions catalytically, that is, the iodine or bromine is typically not substantially incorporated into the organochlorine compound. Thus the amount of the source of iodine or bromine can be reduced to fairly low levels when used in conjunction with at least one of the acids described above provided that sufficient time is available to treat the organochlorine containing compound.

The reaction time is generally whatever time is required to achieve the desired dechlorination of the organochlorine compound. The reaction may be accelerated by the application of mechanical (stirring) and heat energy provided that any desired product is not decomposed by the reaction conditions.

When typically dealing with the organochlorine compound, the amount of the source of iodine or bromine (on an equivalent basis as iodine or bromine) is conveniently from about $1 \times 10^{-5}$ to about 10 per equivalent of chlorine in the organochlorine compound. More typically the equivalents of the source of iodine or bromine present will be from $1 \times 10^{-3}$ to 5 per equivalent of bound chlorine. When an acid and a source of iodine or bromine are used in the process of the invention, the relative amounts of the two can be varied. Generally the amount of iodine or bromine source is greater than the amount of acid used in the process. The order of addition of the at least one acid and the iodine or bromine source is not critical provided the materials are allowed to mix.

The process of reducing the chlorine content of the organochlorine compound by contacting with at least one acid as described above and a source or iodine or bromine in the absence of elemental carbon is typically conducted between $-50°$ C. and $300°$ C. and preferably between $15°$ C. to $250°$ C. Most preferably the process is conducted at $60°$ C. to $250°$ C.

In another embodiment, the source of iodine or bromine employed in the reaction may be the effluent from the same or a different process. The effluent may be a gas or a liquid but is preferably a gas. For example, when effluent is removed from the reaction mixture of an organochlorine compound and a source of iodine or bromine, the effluent may contain at least some of the chlorine which has been liberated from the organochlorine compound, and unreacted bromine or iodine materials initially added to the reaction mixture and bromine or iodine compounds formed during the reaction such as hydrogen iodide and hydrogen bromide. The effluent containing the liberated chlorine compounds and various sources of iodine and bromine can be removed from the reaction mixture by blowing with a gas such as nitrogen, by maintaining the reaction mixture at an elevated temperature, by distillation, by stripping through the use of heat and/or by applying a vacuum, etc.

The effluent obtained in this manner can be conveniently recycled to the same or a different vessel used for treating organochlorine compounds in accordance with the process of the present invention. In this embodiment, the effluent which is recovered from a first process for recycling to a second process may be treated to remove one or more of the different chlorine compounds which may be contained in the effluent before the effluent is brought into contact with the second organochlorine compound. For example, the effluent from the first process may be treated to obtain a reduction of its chlorine content prior to contact with the second organochlorine compound. Chlorine compounds which may be removed from the effluent include hydrogen chloride, low molecular weight alkyl chlorides, chlorinated lower olefins, etc. The chlorine content of the effluent may be reduced by, for example, treating the effluent with caustic and/or by cooling the effluent to a temperature sufficient to liquify one or more of the chlorine compounds contained in the effluent and thereafter removing the liquified chlorine compounds.

In another embodiment, the effluent may be treated with an oxidant to convert any HI or HBr in the effluent to elemental iodine or elemental bromine before the effluent is used in a second process. For example, HI present in the effluent can be converted to elemental iodine by contacting the effluent with a peroxide in the presence of water or air and, optionally, in the presence of a transition metal such as copper.

Accordingly, in one embodiment of the invention, an initial reaction vessel containing an organochlorine compound, and optionally, at least one of the acids described above is treated with a source of iodine or bromine in the absence of elemental carbon to reduce the chlorine content of the organochlorine compound. During or after this treatment, effluent is removed from the reaction mixture by any of the methods described above, and the effluent is recycled to the same vessel for further treatment of the organochlorine compound or may be recycled to a second reaction vessel containing an organochlorine compound and at least one acid as described above, to reduce the chlorine content of the organochlorine compound contained in the second reaction vessel. In this manner, the need for a fresh source of iodine or bromine is minimized or eliminated.

In one embodiment of the present invention, the effluent source of iodine or bromine from one reaction mixture is recycled to a second reaction vessel rather than being recycled to the same reaction vessel. In this embodiment, the source of iodine or bromine introduced into the second vessel may be the effluent from another reaction which may involve the same or a different organochlorine compound and may or may not include at least one acid of the type described above. Thus, the process of the invention for reducing the chlorine content of a second organochlorine compound may comprise (A) contacting the second organochlorine compound with
(a) at least one acid selected from the group consisting of Lewis acids, mineral acids other than hydriodic and hydrobromic acids, and an organic acid having a pKa of less than about 2, and (b) a source of iodine or bromine or mixture thereof in the absence of elemental carbon to form one or more different chlorine compounds wherein at least a portion of the source of iodine or bromine is obtained from the effluent of a first process to reduce the chlorine content of a first organochlorine compound wherein the first organochlorine compound is contacted with a source of iodine or bromine or a mixture thereof (with or without an acid as described above) in the absence of elemental carbon; and (B) separating at least one of the different chlorine compounds formed in (A) from the second organochlorine compound. Generally, the one or more different chlorine compounds formed in the process are more volatile than the organochlorine compound which facilitates the separation of the different chlorine compounds formed in the process from the organochlorine compounds. When the effluent of a first process is utilized as the source of iodine or bromine for treating a second organochlorine compound, the first organochlorine compound preferably is treated with elemental iodine or elemental bromine, or mixtures thereof. The different chlorine compounds contained in the effluent of the first process may be removed before the effluent is used in the second process.

As noted above, the organochlorine compound treated in the first process may be the same as or different from the organochlorine compound treated in the second process with the effluent of the first process. In some instances, it may be advantageous to utilize an organochlorine compound in the second process which is different from the organochlorine compound used in the first process. For example, a polyisobutenylsuccinic anhydride compound which contains chlorine may be treated with an initial source of iodine or bromine in accordance with the process of the invention, and the effluent obtained from this first process may then be utilized to lower the chlorine content of, for example, a polyisobutenyl chloride. Conducting the reactions on different organochlorine compounds may be advantageous depending upon the sensitivity of the organochlorine compounds to the type and/or amount of iodine or bromine or other by-products in the effluent. For example, it may be more effective to use the effluent of a first process for treating a second organochlorine compound rather than returning the effluent to the initial organochlorine reactor if the second organochlorine compound is more sensitive than the first organochlorine compound to the form of iodine or bromine contained in the effluent.

The reaction to reduce the chlorine content may appropriately be run under solvent free conditions or under conditions where no added solvent is employed. If a solvent is used then a hydrocarbon solvent such as a hydrocarbon oil, mineral oil, a hydrogenated polyalphaolefin, polyisobutylene, toluene, or xylene are commonly employed. In a preferred aspect of the invention where polyisobutenylsuccinic anhydride is treated with the source of iodine or bromine there will often be unreacted polyisobutylene from the acylation reaction. Thus in a preferred aspect the previously mentioned acylation reaction need not have the unreacted polyisobutylene removed. It is preferred that the solvent not be one containing oxygen moieties such as an aldehyde or ketone, and in particular acetone which is volatile, flammable and which must be removed from the reaction mixture. The solvent may be used in any useful amount such as in a weight ratio to the organochlorine of 0.01 to 250:1, conveniently 0.05:1 to 25:1. The term solvent is used freely herein to include materials which are sufficient in small amounts to allow a reduction in viscosity to facilitate processing.

The time required to remove the chlorine from the organochlorine compound is conveniently 1 hour to 96 hours, often less than 24 hours. It is believed that the chlorine is removed from the organochlorine compound by the iodine or bromine or certain forms of iodine or bromine such as HI or HBr, and one or more different chlorine compounds or olefins are formed. For example, the different compounds may be one or more of the following: HCl, organic chloride (e.g., alkyl or alkylene chloride), isobutylene, etc. Generally these different compounds are more volatile than the organochlorine compound from which they are derived, and these more volatile compounds may volatilize and leave the reaction mixture during the reaction.

Removal of the different chlorine compounds can be effected by heating the mixture, by applying a vacuum, or by a gas flow through or over the mixture. Thus, in one embodiment, the dechlorination process is facilitated by blowing an inert gas through the mixture of the organochlorine compound and (a) at least one acid selected from the group consisting of Lewis acids, mineral acids other than hydriodic acid and hydrobromic acid, and organic acids having a pKa of less than about 2, and, optionally, (b) a source of iodine or bromine in the absence of elemental carbon. The gas utilized to aid in the process may be any gas which is substantially inert in the process such as nitrogen, carbon dioxide, or steam, or the true inert gases such as argon or neon. Mixtheat of gases such as a mixture of super heated steam and nitrogen also are useful. In one embodiment, the gas is not hydrogen.

In one preferred embodiment of the invention, the gas is not bubbled through the mixture of organochlorine compound, acid and source of iodine or bromine until the source of iodine or bromine has been thoroughly blended into the organochlorine compound. If the source of bromine or iodine is not thoroughly blended into the organochlorine compound, the gas removes the source of bromine or iodine before it can be effective, and the overall reduction in chlorine is less than expected. Thus in one embodiment, the organochlorine compound is heated in a reactor to an elevated temperature such as 100°–150° C. and the acid and source of iodine or bromine are added to the reactor and blended into the organochlorine compound such as by stirring under closed conditions for 15 minutes to 2 hours or more. At this time, a gas (preferably nitrogen) is bubbled through the mixture in the reaction flask as the temperature is raised to about 200°–250° C. Bubbling of the gas (preferably vigorous) is continued at this temperature for periods of from 2 or 6 hours up to 24 hours or more. Volatile chlorine products are formed and removed from the reaction vessel with the gas.

It also has been observed that the gas does not have to be bubbled through the mixture of organochlorine compound and iodine or bromine source. The chlorine compounds formed during the reaction can be removed by passing the gas vigorously over the stirred and heated mixture. In one preferred embodiment, the gas can be vigorously bubbled into a slip stream or side stream of the reaction mixture which may be forwarded to a holding tank, or which may be recirculated to the reaction vessel. Contact of the gas with the smaller quantity of reaction mixture in the slip stream or recirculation stream results in more rapid and effective removal of the chlorine compounds from the reaction mixture. In one variation of the invention, the gas is injected into the discharge of the pump on a recirculation line for the reaction vessel. The combination of improved mixing due to the turbulence in the line and a higher effective concentration of gas in the confined space of the line results in substantial improvement in the effectiveness of chlorine and chloride removal.

A further feature which may be utilized in the present invention is the presence of a proton source. It is believed that proton donors such as hydrogen chloride may aid in the dechlorination reaction or at least are not harmful to the reaction. In any event the presence of a proton (which may be generated in situ) may aid in removing the chlorine from the organochlorine compound. One possible mechanism for the removal of chlorine is that the chlorine in the organochlorine is converted to the corresponding hydrochloride which may be removed conveniently in the gaseous state.

The following examples illustrate the preparation of chlorine-containing compounds comprising polyalkenylsuccinic anhydrides which can be treated in accordance with the process of the present invention to reduce the chlorine content thereof.

EXAMPLE A

A material useful as a precursor for a dispersant in a motor oil is manufactured by forming a mixture of 1,000 parts (0.495 mole) of polyisobutene ($\overline{M}n$=2000; $\overline{M}w$=6400) and 106 parts (1.08 moles) of maleic anhydride which is heated to 110° C. This mixture is then heated to 138° C. and further heated to 190° C. over 6 hours during which 60 parts (0.85 moles) of gaseous chlorine is added beneath the surface.

At 184°–189° C. an additional 30 parts (0.42 mole) of chlorine are added over 4 hours. The reaction mixture is stripped by heating at 186°–190° C. with nitrogen blowing for 3 hours. The residue is a polyisobutene-substituted succinic acylating agent having a total acid number of 93. By analysis, the chlorine content of the above-identified product is about 0.72%.

EXAMPLE B

A polyisobutenylsuccinic anhydride product is prepared according to the Rense patent (U.S. Pat. No. 3,231,587) such that the reaction product contains one anhydride group for each equivalent weight of the groups derived from a polyisobutenyl precursor of the polyisobutenylsuccinic anhydride. By analysis, the chlorine content of the above-identified starting product is about 0.310%.

EXAMPLE C

The general procedure of Example A is repeated except that the 1000 parts of polyisobutene are reacted with 103 parts of maleic anhydride in the presence of 90 parts of chlorine. The polyisobutenylsuccinic anhydride prepared in this manner contains 0.49% chlorine.

EXAMPLE D

A mixture of one mole of polypropylene ($\overline{M}n$=1000) and one mole of maleic anhydride is heated to an elevated temperature and a slight excess of gaseous chlorine is added beneath the surface over a period of about four hours. The reaction mixture is stirred by heating at about 190° C. with nitrogen blowing for about 24 hours. The polypropylene-substituted succinic anhydride prepared in this manner has a chlorine content of 0.63%.

EXAMPLE E

The general procedure of Example D is repeated except that the polypropylene is replaced by an equivalent amount of polyisobutylene having an $\overline{M}n$ of 1000. The polyisobutenylsuccinic anhydride prepared in this manner has a chlorine content of 0.76.

EXAMPLE F

The general procedure of Example C is repeated, and the polyisobutenylsuccinic anhydride prepared is found to contain 0.3% chlorine.

EXAMPLE G

The product of Example C is heated to a temperature of about 190°–200° C. and maintained at this temperature for 24 hours while blowing nitrogen through the mixture. The product is found to contain 0.23% chlorine.

The following examples illustrate the process and products of the present invention.

EXAMPLE 1

Five-hundred grams of polyisobutenylsuccinic anhydride of Example C are heated to 190° C., and 0.1 gram of zinc acetate dihydrate is added. The mixture is stirred, and the temperature is raised to 210° C. and maintained at this temperature for 1 hour. The mixture then is blown with nitrogen (0.5 scfh) for 4 hours whereupon the mixture was cooled and recovered as product. The product is found to contain 0.188% chlorine.

EXAMPLE 2

Five-hundred grams of the polyisobutenylsuccinic anhydride prepared in Example C are heated at 190° C. whereupon 0.24 gram of ferrous iodide is added. The mixture is heated to 210° C. and maintained at this temperature for 30 minutes whereupon the mixture is blown with nitrogen (0.4 scfh) below the surface of the mixture for 4 hours at 210° C. The mixture then is cooled and the residue is recovered as product. The product contained in this manner contains 0.263% chlorine.

EXAMPLE 3

The procedure of Example 2 is repeated except that 0.75 gram of ferrous iodide is added to the reaction mixture. The product prepared in this manner contains 0.186% chlorine and 0.023% iodine.

EXAMPLE 4

Five-hundred grams of the polyisobutenylsuccinic anhydride of Example C and 2 grams of ethyl ethylenetetracarboxylate are mixed and heated to 210° C. Nitrogen is blown through the mixture. After 12 hours of heating at about 210° C., the mixture is cooled, and the residue is recovered as product. The product contains 0.199% chlorine.

EXAMPLE 5

Five-hundred grams of the polyisobutenylsuccinic anhydride of Example C are heated to 190° C., and 0.2 gram of zinc acetate dihydrate is added followed by 0.2 gram of iodine. This mixture is heated with stirring to 210° C. and maintained at this temperature for 30 minutes whereupon nitrogen is blown through the mixture for a total of 24 hours at 210° C. The mixture is cooled and the residue is recovered as product. The product contains 0.153% chlorine and 0.034% iodine.

EXAMPLE 6

Five-hundred grams of the polyisobutenylsuccinic anhydride of Example C are heated to 150° C. with stirring, and 1.12 grams of iodine are added to this temperature. After one hour, the temperature is raised to 190° C., and a flow of nitrogen through the mixture is started. Zinc acetate dihydrate (0.28 gram) is added, and this mixture is maintained at 190° C. for 30 minutes whereupon the temperature is raised to 210° C. and maintained at this temperature for 3 hours. Upon cooling, the residue is recovered as the desired product which contains 0.118% chlorine and 0.053% iodine.

EXAMPLE 7

Five-hundred grams of the polyisobutenylsuccinic anhydride of Example C are heated to 150° C. under a stream of nitrogen. The nitrogen stream is stopped and 0.2 gram of zinc acetate dihydrate and 0.3 gram of iodine are added to the mixture with stirring. The mixture then is heated to 210° C. and maintained at this temperature for 4 hours whereupon nitrogen is blown through the mixture with stirring for 4 hours at 210° C. The mixture is cooled and the residue is recovered as the product which contains 0.132% chlorine and 0.037% iodine.

EXAMPLE 8

Five-hundred grams of the polyisobutenylsuccinic anhydride of Example C are heated to 190° C. under an atmosphere of nitrogen. At this temperature, the nitrogen flow is stopped and 0.1 gram of zinc acetate dihydrate and 1 gram of iodine are added. The mixture is stirred and the temperature of the mixture is raised to 210° C. After 30 minutes at this temperature, a subsurface stream of nitrogen is begun, and the mixture is maintained at this temperature for 4 hours. The mixture then is cooled and the residue is recovered as product which contains 0.092% chlorine and 0.057% iodine.

EXAMPLE 9

Five-hundred grams of the polyisobutenylsuccinic anhydride of Example C is heated to 190° C. with nitrogen blowing at 0.3 scfh. The nitrogen blowing is stopped, and 0.1 gram of zinc acetate dihydrate is added. The mixture is stirred for 4 minutes whereupon 2 grams of iodine are added. The mixture is heated to 210° C. and maintained at this temperature for 30 minutes without nitrogen blowing. The nitrogen blowing is then begun at 0.5 scfh and maintained for 4 hours at 210° C. The mixture is then cooled and the residue is the product containing 0.097% chlorine and 0.073% iodine.

EXAMPLE 10

The general procedure of Example 9 is repeated except that only 0.5 gram of iodine is added to the mixture. The product prepared in this manner contains 0.130% chlorine.

EXAMPLE 11

Five-hundred grams of the polyisobutenylsuccinic anhydride of Example C are heated with stirring to 150° C., and 0.2 gram of zinc acetate dihydrate is added. The mixture is then heated to 190° C. whereupon 0.5 gram of iodine is added. The mixture is stirred at 190° C. for 1 hour, and nitrogen is blown through the mixture at 1 scfh over a period of 24 hours while maintaining the temperature at about 190° C. The residue is recovered as the product, and the product contains 0.104% chlorine and 0.081% iodine.

EXAMPLE 12

Five-hundred grams of the polyisobutenylsuccinic anhydride of Example C are heated to 150° C. while blowing with nitrogen at 0.2 scfh whereupon 0.1 gram of ferric chloride is added and the nitrogen flow is stopped. Iodine (0.6 gram) is added, and the mixture is heated to 210° C. and maintained at this temperature for 1 hour. At this time, the flow of nitrogen is resumed at 0.2 scfh, and the mixture is maintained at 210° C. for 3 hours. Upon cooling, the residue is recovered as the product which contains 0.133% chlorine and 0.023% iodine.

EXAMPLE 13

Five-hundred grams of the polyisobutenylsuccinic anhydride of Example C are heated with stirring to 150° C. while blowing with nitrogen at 0.5 scfh. At 150° C., 10 drops of 93% sulfuric acid are added as the mixture is heated with nitrogen blowing to 190° C. At this temperature, 2 grams of iodine are added, and the nitrogen blowing is stopped. The mixture is stirred for 5 minutes, and 0.5 gram of ferric chloride is added. The mixture is heated to 210° C. with stirring for 30 minutes without nitrogen. At this time, nitrogen blowing is resumed at 0.5 scfh, and the temperature is maintained at 210° C. for 4 hours. The mixture is cooled and the residue is the product containing 0.084% of chlorine.

EXAMPLE 14

Five-hundred grams of the polyisobutenylsuccinic anhydride of Example C are heated to a temperature of 150° C. while blowing with nitrogen at 0.5 scfh. At this temperature, 10 drops of 93% sulfuric acid are added and the mixture is heated to 190° C. with nitrogen blowing. Iodine (2 grams) is then added to the mixture followed by 0.1 gram of ferric chloride. The nitrogen blowing is stopped and the mixture is heated to 210° C. and maintained at this temperature for 30 minutes without nitrogen blowing. The nitrogen mixture then is blown with nitrogen at 0.5 scfh for 4 hours at 210° C., and the cooled residue is the desired product containing 0.085% of chlorine.

EXAMPLE 15

The general procedure of Example 14 is repeated except that the ferric chloride is replaced by 0.1 gram of zinc acetate dihydrate. The product obtained in this manner contains 0.071% chlorine.

EXAMPLE 16

Five-hundred grams of the polyisobutenylsuccinic anhydride of Example C are heated to 150° C. while blowing with nitrogen at 0.2 scfh, and 1.12 grams of iodine are added. The nitrogen flow is stopped and the mixture is stirred for 1 hour at 150° C. and then heated to 190° C. At 190° C., the mixture is blown with nitrogen and 0.11 gram of magnesium is added. After maintaining the mixture at 190° C. for 30 minutes, the mixture is heated to 210° C. and maintained at this temperature for 3 hours. The mixture is cooled, and the residue is the product which contains 0.179% chlorine and 0.034% iodine.

EXAMPLE 17

Five-hundred grams of the polyisobutenylsuccinic anhydride of Example C are heated with stirring to 150° C. while blowing with nitrogen at 0.6 scfh. Magnesium sulfate (0.5 gram) is added, and the nitrogen blowing is stopped. The mixture is heated to 190° C. whereupon 1 gram of iodine is added. After heating the mixture to 210° C. and maintaining the mixture at this temperature for 1 hour, the mixture is again blown with nitrogen at 0.5 scfh and maintained at 210° C. for 4 hours. The mixture is then cooled and the residue is recovered as product which contains 0.155% chlorine.

EXAMPLE 18

Five-hundred grams of the polyisobutenylsuccinic anhydride of Example C are heated to 150° C. while blowing with nitrogen at 0.6 scfh. The nitrogen blowing is stopped, and 0.25 gram of zinc oxide is added with stirring. The mixture is then heated to 190° C. whereupon 0.5 gram of iodine is added. The mixture is heated to 210° C. and maintained at this temperature for 1 hour. The mixture then is blown with nitrogen at 0.6 scfh and maintained at 210° C. for 24 hours. After cooling, the residue is collected as product which contains 0.072% chlorine and 0.090% iodine.

EXAMPLE 19

Five-hundred grams of the polyisobutenylsuccinic anhydride of Example C are heated to 150° C. while blowing with nitrogen at 0.6 scfh. At 150° C., the nitrogen is stopped, and 0.25 gram of calcium sulfate is added. This mixture is stirred for 10 minutes and heated to 190° C. whereupon 0.5 gram of iodine is added. The mixture is then heated to 210° C. and maintained at this temperature for 1 hour whereupon the mixture was then blown with nitrogen for 24 hours while maintaining the temperature of the mixture at 210° C. The mixture is cooled, and the residue is the desired product containing 0.083% chlorine and 0.031% iodine.

EXAMPLE 20

Five-hundred grams of the polyisobutenylsuccinic anhydride of Example C are heated to 190° C. and 0.1 gram of zinc oxide and 0.25 gram of iodine are added. The mixture is then heated to 210° C., and after 1 hour at this temperature, nitrogen is blown through the mixture at 0.4 scfh for 4 hours. The mixture is cooled and the residue is the product containing 0.158% chlorine and 0.035% iodine.

EXAMPLE 21

Five-hundred grams of the polyisobutenylsuccinic anhydride of Example C are heated to 190° C. and 0.29 gram of zinc oleate and 1 gram of iodine are added. This mixture is heated with stirring to 210° C. and maintained at this temperature for 30 minutes. The mixture is blown with nitrogen for 4 hours whereupon the mixture is cooled and the residue is recovered as the product. The product contains 0.093% chlorine and 0.064% iodine.

EXAMPLE 22

The procedure of Example 21 is repeated except that only 0.14 gram of zinc oleate is added to the mixture. The product obtained in this manner is found to contain 0.080% chlorine and 0.049% iodine.

EXAMPLE 23

Five-hundred grams of the polyisobutenylsuccinic anhydride of Example F are heated to 190° C. whereupon 0.2 gram of zinc acetate is added followed by 0.1 gram of ferric chloride and 0.2 gram of iodine. This mixture is blown with nitrogen at 0.5 scfh as the mixture is heated to 200° C. The mixture is maintained at this temperature with nitrogen blowing for 12 hours. The mixture is cooled, and the residue is recovered as product which contains 0.091% chlorine and 0.024% iodine.

EXAMPLE 24

Five-hundred grams of the polyisobutenylsuccinic anhydride of Example F are heated with stirring to 190° C. while blowing with nitrogen at 0.5 scfh. The nitrogen blowing is stopped, and zinc acetate (0.2 gram), ferric chloride (0.1 gram), and iodine (0.2 gram) are added to the mixture with stirring at 190° C. The mixture is maintained at this temperature for 30 minutes whereupon the mixture is heated to 210° C. At this temperature, the mixture is blown with nitrogen at 0.6 scfh for 4 hours. The mixture is cooled, and the residue is recovered as product which contains 0.077% chlorine and 0.034% iodine.

EXAMPLE 25

Five-hundred grams of the polyisobutenylsuccinic anhydride of Example G are heated to 190° C. while blowing with nitrogen at 0.5 scfh. The nitrogen blowing is stopped, and 0.2 gram of zinc acetate dihydrate and 0.2 gram of iodine are added. This mixture is heated with stirring to 210° C. and maintained at this temperature for 30 minutes. The nitrogen blowing is resumed, and the mixture is maintained at 210° C. for 4 hours. The mixture is cooled and the residue is recovered as product which contains 0.144% chlorine and 0.028% iodine.

EXAMPLE 26

Five-hundred grams of the polyisobutenylsuccinic anhydride of Example C are heated to 210° C., and the effluent (volatiles) from the procedure of Example 25 are allowed to pass through the mixture for 6 hours at this temperature. The reaction mixture is cooled and the residue is recovered as product.

EXAMPLE 27

The procedure of Example 13 is repeated except the polyisobutenylsuccinic anhydride of Example C is replaced by 500 grams of the polypropylene-substituted succinic anhydride of Example D.

EXAMPLE 28

Five-hundred grams of polyisobutenylsuccinic anhydride of Example C are heated to 190° C., and 0.25 gram of zinc iodide is added. This mixture is heated to 210° C. with stirring and maintained at this temperature for 30 minutes whereupon a stream of nitrogen is bubbled through the mixture at 0.4 scfh. Nitrogen blowing is continued for 4 hours whereupon the mixture is cooled and recovered as product. The product contains 0.198% chlorine and 0.07% iodine.

EXAMPLE 29

Five-hundred grams of the polyisobutenylsuccinic anhydride of Example C are heated to 150° C. with nitrogen blowing at 0.6 scfh. The nitrogen blowing is stopped, and 0.2 gram of zinc acetate is added. The mixture is heated to 190° C. whereupon 0.5 gram of iodine is added, and the mixture is maintained at 210° C. for 1 hour. At this time, nitrogen is blown through the mixture at 0.5 scfh and then at 1 scfh. The mixture is maintained at 210° C. with nitrogen blowing at 1 scfh for 24 hours while removing volatile materials. The residue is recovered as the product which is found to contain 0.072% chlorine and 0.070% iodine.

EXAMPLE 30

Five-hundred grams of the polyisobutenylsuccinic anhydride of Example C are stirred and heated to 150° C. with nitrogen blowing at 0.5 scfh. At this temperature, 5 drops of 93% sulfuric acid are added and nitrogen blowing is stopped. The mixture is heated to 210° C. and maintained at this temperature without nitrogen blowing for 30 minutes. The mixture then is blown with nitrogen at 0.5 scfh for 4 hours at 210° C. After cooling at room temperature, the residue is recovered as the product which contains 0.224% chlorine.

EXAMPLE 31

Five-hundred grams of the polyisobutenylsuccinic anhydride of Example C are heated with stirring to a temperature of 150° C. with nitrogen blowing at 0.5 scfh. At this temperature, 5 drops of 93% sulfuric acid are added and the nitrogen blowing is stopped. The mixture is heated to 190° C., and 0.25 gram of iodine is added. The mixture is heated to 210° C. and maintained at this temperature without nitrogen blowing for one-half hour. The mixture then is blown with nitrogen at 0.5 scfh for 4 hours at 210° C. The residue is cooled and recovered as the product which is found to contain 0.164% chlorine and 0.016% iodine.

EXAMPLE 32

Five-hundred grams of the polyisobutenylsuccinic anhydride of Example C are stirred and heated to 160° C. with nitrogen blowing at 0.5 scfh. At this temperature, the nitrogen blowing is stopped, and 5 drops of 93% sulfuric acid are added. This mixture is heated without nitrogen blowing to 190° C., and at this temperature, 0.25 gram of iodine is added. The mixture is heated to 210° C. without nitrogen and maintained at this temperature for 1 hour. Nitrogen is then blown through the mixture at 1 scfh for 4 hours at 210° C. The residue is cooled and recovered as the product which is found to contain 0.150% chlorine and 0.018% iodine.

EXAMPLE 33

Five-hundred grams of the polyisobutenylsuccinic anhydride of Example C are heated to 190° C., and zinc iodide is added. The mixture is heated to 210° C. and maintained at this temperature for 30 minutes whereupon nitrogen is blown through the mixture at 0.4 scfh for 4 hours. The mixture is cooled, and the residue is recovered as the product which is found to contain 0.121% chlorine and 0.096% iodine.

EXAMPLE 33-38

In these examples, 500 grams of the polyisobutenylsuccinic anhydride of Example C are heated to 190° C. whereupon 0.2 gram of iodine and 0.2 gram of zinc acetate are added. This mixture is then heated to 210° C. over a period of 1 hour whereupon nitrogen is blown through the mixture at 0.3 scfh for a total of 16 hours. Samples are removed from the reaction mixture for analysis after 2, 4, 6, 8 and 17 hours of total heating. The results of the chlorine and nitrogen analysis on the samples recovered in Examples 34–38 are shown in the following Table I.

For comparison purposes, the procedures of Examples 34–38 is repeated except that the zinc acetate is omitted. These examples are identified as 34C, 35C, 36C, 37C and 38C. Thus, the mixture which is heated contains 500 grams of the polyisobutenyl succinic anhydride of Example C and 2 grams of iodine. The chlorine and iodine analysis for the samples of the reaction mixture recovered at 2, 4, 6, 8 and 17 hours of total heating (190° C. and 210° C.) also are summarized in the following Table I.

TABLE I

| Example | Total Heating (hours) | Chlorine % w | Iodine % w |
|---|---|---|---|
| 34 | 2 | 0.102 | 0.113 |
| 34C | 2 | 0.281 | 0.077 |
| 35 | 4 | 0.078 | 0.083 |
| 35C | 4 | 0.202 | 0.042 |
| 36 | 6 | 0.069 | 0.076 |
| 36C | 6 | 0.167 | 0.040 |
| 37 | 8 | 0.068 | 0.079 |
| 37C | 8 | 0.133 | 0.034 |
| 38 | 17 | 0.061 | 0.061 |
| 38C | 17 | 0.096 | 0.029 |

As can be seen from the results summarized in the above Table I, although iodine alone is effective in reducing the chlorine content, and the chlorine content decreases as the time of heating is extended, the chlorine content of the reaction mixtures are further reduced when zinc acetate is used in combination with the iodine.

The carboxylic compositions described above, including the mixtures of carboxylic compositions have utility in and of themselves as additives for lubricants and fuel compositions. For example, the carboxylic compositions can be used as fuel additives to reduce deposit formations for use in concentrations of from 50 to about 1000 ppm in hydrocarbon-based fuels. The carboxylic compositions also may be used in lubricant compositions where they function as dispersant-detergents. Accordingly, the present invention includes the use of the carboxylic compositions and concentrates of the compositions as additives in treating lubricants and fuels. Concentrates of the carboxylic compositions useful for formulating lubricating compositions in fuels generally will comprise from 20 to about 99% by weight of a normally liquid, substantially inert organic solvent/diluent and from about 1 to about 80% by weight of at least one of the carboxylic compositions described herein. When used in lubricating compositions, the lubricating compositions will comprise a major amount of an oil of lubricating viscosity and a minor amount of at least one of the carboxylic compositions described herein. When used in fuel compositions, the fuel compositions will comprise a major amount of a normally liquid fuel and a minor amount of at least one of the carboxylic compositions described herein.

Procedures for preparing esters, amides, imides, amine salts and metal salts from carboxylic acylating agents are well known to those skilled in the art and are described in many patents. For example, reactions with hydroxy compounds to form esters are described in U.S. Pat. Nos. 3,331,776; 3,381,022; 3,522,179; and 3,542,680; reactions with amines to form amides, imides and amine salts are described in U.S. Pat. Nos. 3,172,892; 3,219,666; and 3,272,746; and reactions with reactive metals to form metal salts are described in U.S. Pat. Nos. 3,271,310; 3,306,908; and Re 26,433. All of these patents are expressly incorporated herein by reference.

In particular, such dispersants may be made by reaction with polyamines and/or polyols as described in U.S. Pat. No. 4,234,435 issued Nov. 18, 1980 to Meinhardt and Davis or U.S. Pat. No. 3,215,707 issued Nov. 2, 1965 to Rense both of which are incorporated herein by reference.

While a polyamine or a mixed polyamine ester product may be treated with the source of iodine or bromine to remove the halogen, such is not always desirable. That is, the process is most conveniently conducted on the acylating agent precursor for various reasons including cost and throughput considerations.

The following examples illustrate the preparation of products useful as dispersants in lubricating oil compositions.

EXAMPLE I

A mixture is prepared by the addition of 10.2 parts (0.25 equivalent) of a commercial mixture of ethylene polyamine having from about 3 to about 10 nitrogen atoms per molecule to 113 parts of mineral oil and 0.25 equivalent of the product of Example 1. The reaction mixture is heated to 150° C. in two hours and stripped by blowing with nitrogen. The reaction mixture is filtered to yield a filtrate as the oil solution of the desired aminated dispersant.

EXAMPLE II

The procedure of Example I is repeated except that the product of Example 1 is replaced by the product of Example 5.

EXAMPLE III

The procedure of Example I is repeated except that the product of Example 1 is replaced by an equivalent amount of the product of Example 15.

Esters of the polyalkenylsuccinic anhydrides can be prepared utilizing the procedures of U.S. Pat. No. 4,234,435 by reacting the anhydrides with polyols such as pentaerythritol. The products of Examples I to III may be further treated according to industry practices to obtain further useful products. For example, the products of Examples I to III can be reacted with boric acid to prepare boronated dispersants.

The polyalkenyl-substituted succinic acids containing a reduced amount of chlorine can be used, as noted above, to prepare dispersants useful in lubricants, two-cycle oils, emulsions and fuels including gasoline. More particularly, the dispersants which may be prepared from the polyalkenylsuccinic anhydrides or acids prepared in accordance with the process of this invention and containing a reduced amount of chlorine may be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, etc. They can also be used in gas engines, stationary power engines and turbines and the like. Automatic or manual transmission fluids, transaxle lubricants, gear lubricants, including open and enclosed gear lubricants, tractor lubricants, metal-working lubricants, hydraulic fluids and other lubricating oil and grease compositions can also benefit from the incorporation therein of the dispersants discussed above. The dispersants may also be used in wire rope, walking cam, way, rock drill, chain and conveyor belt, worm gear, bearing, and rail and flange lubricants.

Products such as those described above in Examples I to III may be used in lubricants or in concentrates, by themselves or in combination with any other known additives which include, but are not limited to other dispersants, detergents, antioxidants, anti-wear agents, extreme pressure agents, emulsifiers, demulsifiers, foam inhibitors, friction modifiers, anti-rust agents, corrosion inhibitors, viscosity improvers, pour point depressants, dyes, and solvents to improve handleability which may include alkyl and/or aryl hydrocarbons. These additives may be present in various amounts depending on the needs of the final product.

Other dispersants include, but are not limited to, Mannich dispersants and mixtures thereof as well as materials functioning both as dispersants and viscosity improvers. Mannich dispersants are prepared by reacting a hydroxy aromatic compound with an amine and aldehyde. The dispersants described above may be post-treated with reagents such as urea, thiourea, carbon disulfide, aldehydes, ketones, carboxylic acids, hydrocarbon-substituted succinic anhydride, nitriles, epoxides, boron compounds, phosphorus compounds and the like.

Detergents include, but are not limited to, Newtonian or non-Newtonian, neutral or basic salts of alkaline earth or transition metals with one or more hydrocarbyl-substituted sulfonic, carboxylic, phosphoric, thiophosphoric, dithiophosphoric, phosphinic acid, or thiophosphinic acids, sulfur coupled phenol or hydrocarbon-substituted phenols. Basic salts are salts that contain a stoichiometric excess of metal present per acid function.

Auxiliary extreme pressure agents and corrosion- and oxidation-inhibiting agents which may be included in the lubricants of the invention are exemplified by chlorinated aliphatic hydrocarbons such as chlorinated olefins or wax; organic sulfides and polysulfides such as benzyl disulfide, bis(chlorobenzyl)disulfide, dibutyltetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate, phosphorus esters including principally dihydrocarbyl and trihydrocarbyl phosphites such as dibutyl phosphite, diheptyl phosphite, dicyclohexyl phosphite, pentyl phenyl phosphite, dipentyl phenyl phosphite, tri-decyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; dithiocarbamate containing amides prepared from dithiocarbamate acid and an acrylamide (e.g., the reaction product of dibutylamine, carbon disulfide and acrylamide); alkylene-coupled dithiocarbamates(e.g., methylene or phenylene bis (dibutyldithiocarbamate)); and sulfur-coupled dithiocarbamates (e.g., bis(s-alkyldithiocarbamoyl)disulfides); metal thiocarbamates, such as zinc dioctyldithiocarbamate, and barium heptylphenyldithiocarbamate; boron-containing compounds including borate esters; molybdenum compounds; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Viscosity improvers include, but are not limited to, polyisobutenes, polymethacrylate acid esters, polyacrylate acid esters, hydrogenated diene polymers, polyalkyl styrenes, hydrogenated alkenyl aryl conjugated diene copolymers, polyolefins and multifunctional viscosity improvers.

Pour point depressants are a particularly useful type of additive often included in the lubricating oils described herein. See, for example, page 8 of "Lubricant Additives" by C. V. Smalheer and R. Kennedy Smith (Lesius-Hiles Company Publishers, Cleveland, Ohio, 1967).

Anti-foam agents used to reduce or prevent the formation of stable foam include silicones or organic polymers. Examples of these and additional anti-foam compositions are described in "Foam Control Agents," by Henry T. Kerner (Noyes Data Corporation, 1976), pages 125–162.

These and other additives are described in greater detail in U.S. Pat. No. 4,582,618 (Col. 14, line 52 through Col. 17, line 16, inclusive), herein incorporated by reference for its disclosure of other additives that may be used in combination with the present invention.

The concentrate may contain 0.01% to 90% by weight of the dispersants of the invention. The dispersants may be present in a final product, blend or concentrate in a minor amount, i.e., up to 50% by weight or in any amount effective to act as a dispersants, but is preferably present in oil of lubricating viscosity, hydraulic oils, fuel oils, gear oils or automatic transmission fluids in an amount of from about 0.1% to about 10%.

The lubricating compositions and methods of this invention employ an oil of lubricating viscosity, including natural or synthetic lubricating oils and mixtures thereof. Natural oils include animal oils, vegetable oils, mineral lubricating oils, solvent or acid treated mineral oils, and oils derived from coal or shale. Synthetic lubricating oils include hydrocarbon oils, halo-substituted hydrocarbon oils, alkylene oxide polymers, esters of carboxylic acids and polyols, esters of polycarboxylic acids and alcohols, esters of phosphorus-containing acids, polymeric tetrahydrofurans, silicon-based oils and mixtures thereof.

Specific examples of the oils of lubricating viscosity are described in U.S. Pat. No. 4,326,972 and European Patent Publication 107,282, both herein incorporated by reference for their disclosures relating to lubricating oils. A basic, brief description of lubricant base oils appears in an article by D. V. Brock, "Lubricant Base Oils," *Lubricant Engineering*, Vol. 43, pages 184–185, Mar., 1987. This article is herein incorporated by reference for its disclosures relating to lubricating oils. A description of oils of lubricating viscosity occurs in U.S. Pat. No. 4,582,618 (Col. 2, line 37 through Col. 3, line 63, inclusive), herein incorporated by reference for its disclosure to oils of lubricating viscosity.

The following examples exemplify the concentrates and lubricating oil compositions of the invention.

|  | %/wt. |
|---|---|
| Concentrate I |  |
| Product of Example 1 | 90 |
| Mineral oil | 10 |
| Concentrate II |  |
| Product of Example 2 | 85 |
| Mineral oil | 15 |
| Concentrate III |  |
| Product of Example 1 | 70 |
| Basic calcium alkylated benzene sulfonate | 10 |
| Mineral oil | 20 |
| Lubricant I |  |
| Product of Example 1 | 6.5 |
| Mineral oil | 93.5 |
| Lubricant II |  |
| Product of Example 2 | 6.0 |
| Basic calcium alkylated benzene sulfonate | 1.0 |
| Zinc salt of mixed secondary dialkyldithiophosphate | 1.0 |
| Mineral oil | 92 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for reducing the chlorine content of an organochlorine compound comprising:

introducing into the organochlorine compound, at least one Lewis acid to form a mixture, and contacting the organochlorine compound with the Lewis acid in the mixture in the absence of elemental carbon for a sufficient mount of time to reduce the chlorine content of the organochlorine compound, said Lewis acid consisting of salts of zinc, magnesium, calcium, iron, copper, boron, aluminum, tin and titanium and mixtures thereof.

2. The process of claim 1 conducted at a temperature of from about 60° C. to about 250° C.

3. The process of claim 1 wherein an inert gas is passed over the mixture or blown through the mixture or a portion of the mixture during the reduction of the chlorine content.

4. The process of claim 3 wherein the gas blown through the mixture is nitrogen.

5. The process of claim 3 wherein the gas is steam.

6. The process of claim 1 conducted in a vessel equipped with a recirculation pump, and an inert gas is injected into the discharge line of the recirculation pump as the mixture is recirculated through the discharge line.

7. The process of claim 6 wherein the gas is nitrogen or steam.

8. The process of claim 1 wherein the organochlorine compound is a chlorine-containing organic polymeric compound.

9. The process of claim 1 wherein the chlorine is removed in a gaseous or liquid state.

10. The process of claim 1 wherein the organochlorine compound is a reaction product of a polyolefin and maleic acid or anhydride prepared in the presence of chlorine.

11. The process of claim 10 wherein the polyolefin is a polyisobutylene.

12. The process of claim 10 wherein the polyolefin is a polyisobutylene having an $\overline{M}n$ of about 300 to about 10,000.

13. The process of claim 12 wherein the polyisobutylene has an $\overline{M}n$ of from about 1300 to about 5000 and an $\overline{M}w/\overline{M}n$ value of from about 1.5 to about 4.0.

14. The process of claim 1 wherein the Lewis acid is a zinc salt, an iron salt, or a mixture of a zinc salt and an iron salt.

15. The product of the process of claim 1.

16. A dispersant for lubricating oil compositions prepared by reacting the product of claim 15 with at least one polyamine or polyol or a mixture of at least one polyamine and at least one polyol.

17. A lubricating oil composition comprising a major amount of an oil of lubricating viscosity and a minor amount of the product of claim 16.

18. A lubricating oil composition prepared by blending a major amount of oil of lubricating viscosity and a minor amount of the product of claim 16.

* * * * *